US008623539B2

(12) United States Patent
Chung et al.

(10) Patent No.: US 8,623,539 B2
(45) Date of Patent: Jan. 7, 2014

(54) MULTILAYER BATTERY SEPARATOR AND METHOD FOR MANUFACTURING THE SAME

(75) Inventors: Li-Han Chung, Miaoli (TW);
Ching-Chun Tsai, Miaoli County (TW);
Dan-Cheng Kong, Hsinchu (TW);
Ming-Cheng Feng, Tainan County (TW); Kuan-Yeh Huang, Hsinchu County (TW)

(73) Assignee: Industrial Technology Research Institute, Hsinchu County (TW)

( * ) Notice: Subject to any disclaimer, the term of this patent is extended or adjusted under 35 U.S.C. 154(b) by 63 days.

(21) Appl. No.: 13/152,668

(22) Filed: Jun. 3, 2011

(65) Prior Publication Data
US 2012/0141858 A1 Jun. 7, 2012

(30) Foreign Application Priority Data

Dec. 6, 2010 (TW) .............................. 99142312 A

(51) Int. Cl.
*H01M 2/14* (2006.01)
(52) U.S. Cl.
USPC ........................................................ 429/144
(58) Field of Classification Search
None
See application file for complete search history.

(56) References Cited

U.S. PATENT DOCUMENTS

| | | | |
|---|---|---|---|
| 5,565,281 A | 10/1996 | Yu et al. | |
| 5,691,047 A | 11/1997 | Kurauchi et al. | |
| 5,922,492 A | 7/1999 | Takita et al. | |
| 6,180,280 B1 | 1/2001 | Spotnitz | |
| 6,586,138 B2 | 7/2003 | Pekala et al. | |
| 2002/0055039 A1 | 5/2002 | Seung et al. | |
| 2003/0190499 A1 | 10/2003 | Watanabe et al. | |
| 2003/0194607 A1 | 10/2003 | Huang | |
| 2004/0018428 A1 | 1/2004 | Cochran et al. | |
| 2005/0014063 A1 | 1/2005 | Shi et al. | |
| 2005/0069770 A1 | 3/2005 | Manev et al. | |
| 2009/0098450 A1 | 4/2009 | Kikuchi et al. | |
| 2009/0169984 A1 | 7/2009 | Liang et al. | |
| 2009/0197159 A1* | 8/2009 | Teshima et al. | 429/145 |
| 2010/0015509 A1* | 1/2010 | Inagaki et al. | 429/93 |
| 2010/0068612 A1* | 3/2010 | Nishikawa | 429/129 |

FOREIGN PATENT DOCUMENTS

| | | |
|---|---|---|
| CN | 1670989 A | 9/2005 |
| CN | 1930703 A | 3/2007 |
| CN | 101265337 A | 9/2008 |
| CN | 101504976 A | 8/2009 |
| CN | 101558513 A | 10/2009 |
| CN | 101714655 A | 5/2010 |
| TW | 1260811 | 8/2006 |
| TW | I310253 | 5/2009 |
| TW | 1311102 | 6/2009 |
| TW | 201006668 A1 | 2/2010 |

OTHER PUBLICATIONS

Jeong et al., "Effect of Solvent-Nonsolvent Miscibility on Morphology and Electrochemical Performance of SiO2/PVdF-HFP-Based Composite Separator Membranes for Safer Lithium-Ion Batteries", Macromol. Chem. Phys. (2010) 211, 420-425.
Sohn et al., "Preparation and characterization of a PVDF-HFP/PEGDMA-coated PE separator for lithium-ion polymer battery by electron beam irradiation", Radiation Physics and Chemistry, 78 (2009) 505-508.
Cui et al., "Preparation of PVDF/PEO-PPO-PEO blend microporous membranes for lithium ion batteries via thermally induced phase separation process", Journal of Membrane Science, 325 (2008) 957-963.
Choi et al., "Electrospun PVDF nanofiber web as polymer electrolyte or separator", Electrochimica Acta, 50 (2004) 339-343.
Lee et al., "Novel porous separator based on PVdF and PE nonwoven matrix for rechargeable lithium batteries", Journal of Power Sources, 139 (2005) 235-241.
Saunier et al., "Study of the Interaction Polymer/Organic Solvents/Salt in Microporous PVdF Separator for Lithium Batteries", Macromol. Symp., (2003) 200, 101-110.
Office Action (Notification of Examination Opinion) issued by the Taiwan Intellectual Property Office on Jun. 13, 2013, for the above-referenced application's counterpart application in Taiwan (Application No. 099142312).
Notice of First Examination Opinon issued by the Taiwan Intellectual Property Office on Jul. 3, 2013, for the above-referenced application's counterpart application in China (Application No. 201010621768.2).

* cited by examiner

*Primary Examiner* — Patrick Ryan
*Assistant Examiner* — Wyatt McConnell
(74) *Attorney, Agent, or Firm* — Pai Patent & Trademark Law Firm; Chao-Chang David Pai

(57) ABSTRACT

A multilayer battery separator is provided. The multilayer battery separator includes a porous polyethylene (PE) film, and a porous thermal resistant film selected from a group consisting of: a weight ratio of polyvinylidene fluoride (PVDF) and cellulose of 90/10-40/60; a weight ratio of polyvinylidene fluoride and polyethylene glycol (PEG) of 99/1-85/15; and polyimide (PI), and combinations thereof. A method for manufacturing the multilayer battery separator is also provided.

16 Claims, No Drawings

MULTILAYER BATTERY SEPARATOR AND METHOD FOR MANUFACTURING THE SAME

CROSS REFERENCE TO RELATED APPLICATIONS

This Application claims priority of Taiwan Patent Application No. 099142312, filed on Dec. 6, 2010, the entirety of which is incorporated by reference herein.

BACKGROUND OF THE INVENTION

1. Field of the Invention

The present invention relates to a battery separator, and in particular relates to a battery separator with good thermal stability.

2. Description of the Related Art

With the progress of the electronic industry, batteries have been broadly applied to all kinds of things, such as mobile phones, digital cameras, laptops, or even electric vehicles. Therefore, demands of the batteries constantly increase. While pursuing improvement of performance of the batteries, there is an increased concern for battery safety.

A typical battery includes electrodes, an electrolyte, and a separator. Ions formed at the electrode are transported in the electrolyte to form a current, such that chemical energy is transformed to electric energy. A lithium-ion battery having high energy density is one of a main power source of electric vehicles due to its high energy density. However, when the energy density of the battery increases, the power and size of the battery may also increase, such that a great amount of heat is produced. Without an effective way to release the heat, temperature of the battery may be increased, resulting in an explosion of the electrolyte. Therefore, the safety of the battery is a high concern.

Thus, a battery separator plays an important role in a lithium-ion battery. A battery separator is placed between two electrodes to prevent physical contact between the two electrodes, such that the safety of the battery may be improved. Furthermore, the battery separator should be chemical resistant and electrochemical resistant, such that the performance of the battery won't be affected.

BRIEF SUMMARY OF THE INVENTION

A detailed description is given in the following embodiments with reference to the accompanying drawings.

An embodiment of the invention provides a multilayer battery separator, comprising: a porous polyethylene (PE) film; and a porous thermal resistant film selected from a group consisting of: a weight ratio of polyvinylidene fluoride (PVDF) and cellulose being 90/10-40/60; a weight ratio of polyvinylidene fluoride and polyethylene glycol (PEG) being 99/1-85/15; and polyimide (PI); and combinations thereof.

Another embodiment of the invention provides a method for manufacturing a multilayer battery separator, comprising: providing a porous polyethylene film; coating a thermal resistant film onto the porous polyethylene film to form a composite film using a wet process, wherein the porous thermal resistant film is selected from a group consisting of: a weight ratio of polyvinylidene fluoride (PVDF) and cellulose being 90/10-40/60; and a weight ratio of polyvinylidene fluoride and polyethylene glycol (PEG) being 99/1-85/15; polyimide (PI); and combinations thereof.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

A multilayer battery separator having thermal shutdown properties and good thermal stability to improve safety of a lithium-ion battery is provided. After a polyolefin film is made, a porous thermal resistant film is applied to the polyolefin film to form a composite battery separator having thermal shutdown properties and good thermal stability. The porous thermal resistant film may be such as polyvinylidiene fluride (PVDF)/cellulose, polyvinylidiene fluride/polyethylene glycol (PEG), polyimide (PI), or combinations thereof. Polyvinylidiene fluride may include polyvinylidiene fluride and its derivatives. The derivatives of polyvinylidiene fluride may include polyvinylidiene fluride-hexafluoropropylene (PVDF-HEP) copolymers, polyvinylidiene fluride-trifluorochloroethylene copolymers, derivatives thereof, or combinations thereof. Cellulose may include cellulose acetate, cellulose diacetate, cellulose triacetate, derivatives thereof, or combinations thereof.

A dry process is used to form a polyethylene film. High density polyethylene particles are placed into a twin screw extruder with a temperature set at 180° C. to 200° C. and extruded through a T-die with a temperature set at 180° C. to 200° C. After cooling, a precursor film with a width of 20 cm is formed. The precursor film is heated in an oven at a temperature of 180° C. to 200° C. for 30 min to 120 min, and then subjected to mechanical stretching. First, a cold drawing is performed at room temperature, and then a hot drawing is performed at a temperature of 80° C. to 120° C. to form a porous film. Finally, a heat setting process is proceeded at a temperature of 80° C. to 120° C. to form a porous polyethylene film.

The porous thermal resistant film is coated onto the porous polyethylene film to form a composite film by a wet process. The wet process may include spin coating, casting, bar coating, blade coating, roller coating, wire bar coating, dip coating, or the like.

Advantages of using the composite film as a battery separator may include adjustable permeability, thermal shutdown properties, and good thermal stability. Therefore, the safety of a battery is improved.

The porous polyethylene film is placed between two electrodes to separate the electrodes, wherein a thickness of the porous polyethylene film may be between about 10 μm and 25 μm. The porous polyethylene film has an appropriate pore size, such that ions inside the battery can have a better transportation rate. In one embodiment, the porous ethylene film has a Gurley value of between about 5 sec/10 cc and 200 sec/10 cc, preferably between about 10 sec/10 cc and 100 sec/10 cc. When the porous polyethylene film has the Gurley value of less than 5 sec/10 cc, the large pore size of the porous polyethylene film results in a high transportation rate of the ions inside the battery. Although the battery can therefore have a high power, the battery temperature may increase too fast. When the porous polyethylene film has a Gurley value of larger than 200 sec/10 cc, the small pore size of the porous polyethylene film results in low ion transportation and therefore a low charging/discharging rate of the battery. The polyethylene of the porous polyethylene film may have a weight-average molecular weight Mw of between about 100,000 and 500,000, preferably between about 150,000 and 400,000. The polyethylene of the porous polyethylene film may have a density of between about 0.935 g/cm$^3$ and 0.975 g/cm$^3$, preferably between about 0.940 g/cm$^3$ and 0.970 g/cm$^3$.

The porous polyethylene film may have a thermal shutdown temperature of between about 125° C. and 135° C. That is, when the temperature inside the battery reaches of over 125° C. to 135° C., the porous polyethylene film is shutdown and the ions inside the battery can no longer be transported. However, although the porous polyethylene film can be shutdown, the temperature inside the battery may not stop increasing immediately. If the temperature keeps increasing, the porous polyethylene film may meltdown and break. Therefore, the separator of the invention further includes a porous thermal resistant film that can resist high temperatures, such that even when the porous polyethylene film melts down and breaks, the separator won't lose its function.

In an embodiment, the average pore size of the porous thermal resistant film should be no less than the average pore size of the porous polyethylene film. Therefore, before the temperature inside the battery reaches the thermal shutdown temperature of the porous polyethylene film, the porous thermal resistant film will not affect the ion transportation rate inside of the battery. The porous thermal resistant film may have a thickness of between about 5 μm and 50 μm. The porous thermal resistant film may have a Gurley value of between 5 sec/10 cc and 40 sec/10 cc preferably. When the porous thermal resistant film has a Gurley value of larger than 40 sec/10 cc, the small pore size of the porous thermal resistant film results in decreasing the charging/discharging rate of the battery. When the porous thermal resistant film has the Gurley value of lower than 5 sec/10 cc, the pore size of the porous thermal resistant film is too large to control the ion transportation rate. In other words, when the porous polyethylene film melts down and breaks due to the high temperature inside the battery, the ions inside the battery can transport freely.

In one embodiment, the porous thermal resistant film is formed of PVDF/cellulose. The porous thermal resistant film includes about 40-90 wt % of the PVDF and about 10-60 wt % of the cellulose. When the porous thermal resistant film includes over 90 wt % of the PVDF, a pore size of the porous thermal resistant film may be too large. For example, if the porous thermal resistant film is completely formed of PVDF, ions inside the battery can be transported freely after the porous polyethylene film is broken. That is, because the pore size of the porous thermal resistant film is too large, the transportation rate of the ions is not controlled, such that the separator loses its function even though the PVDF film still exists, and the temperature inside the battery keeps rising to result in dangerous condition. When the porous thermal resistant film includes less than 40 wt % of the PVDF, the pore size of the porous thermal resistant film may be too small, drastically affecting the charging/discharging rate of the battery.

In another embodiment, the porous thermal resistant film is formed of PVDF/polyethylene glycol. The porous thermal resistant film includes about 85-99 wt % of the PVDF and about 1-15 wt % of the polyethylene glycol. When the porous thermal resistant film includes over 99 wt % of the PVDF, the pore size of the porous thermal resistant film may be too large. When the porous thermal resistant film includes less than 85 wt % of the PVDF, the pore size of the porous thermal resistant film may be too small.

In still another embodiment, the porous thermal resistant film is formed with polyimide (PI).

In one embodiment, the porous thermal resistant film has a thermal meltdown temperature or a glass transition temperature of over 150° C., preferably of over 160° C. That is, the function of the separator can be retained at a temperature of about 150° C., preferably at a temperature of about 160° C.

In one embodiment, the battery separator described above may be applied to a lithium-ion battery. In another embodiment, the battery separator may be applied to a nickel hydride battery. In still another embodiment, the battery separator may be applied to the automobile industry. Comparing the batteries within common electronic products such as mobile phones or laptops, the batteries of electric vehicles require higher charging speed and must be extremely safe.

Compared to a conventional battery separator, the battery separator of the invention is safer. Although the conventional battery, such as those made of non-woven fabrics, has good mechanical strength, its pore size is too big to control ion transportation rate. Also, although the conventional separator is thermal resistant, it does not serve to improve the safety of the battery.

In one embodiment, the battery can have an appropriate ion transportation rate by adjusting the pore sizes of the porous polyethylene film and the porous thermal resistant film. Furthermore, when the battery is overheated, the porous polyethylene film will shutdown to prevent ions from further reacting, such that the temperature inside the battery can lower. However, if the temperature of the battery does not decrease immediately due to the breakage of the porous polyethylene film, the ion transportation rate can still be controlled by the porous thermal resistant film of the battery separator because of its appropriate pore size. Therefore, the safety of the battery is improved.

Advantages of the battery separator of the invention may include current controlling properties, insulating characteristics, thermal shutdown ability, good mechanical strength, or good thermal stability. Breakage of the separator resulting from electrode expansion, power decreasing resulting from compression, short-circuit of the battery resulting from weak thermal resistant, or other problems may not occur in the battery of the invention.

EXAMPLE 1

A battery separator of the embodiment included a porous polyethylene film and a porous thermal resistant film containing polyvinylidene fluoride and cellulose. A weight ratio of polyvinylidene fluoride (PVDF) and cellulose was 60/40. First, high density polyethylene particles were melted and extruded to form a film. A heating treatment was performed to increase crystallinity of the film, and then a tensile machine was used to stretch the film and generate small pores inside the film. A porous polyethylene film (A film) was formed with a thickness of about 15 μm. Next, PVDF and cellulose acetate was added into N-methyl-2-pyrrolidione (NMP) respectively to form solutions containing 14 wt % of PVDF or cellulose acetate. The PVDF and cellulose acetate solutions were mixed at a weight ratio of 60/40. The mixed solution was coated onto an A film. The coating was solidificated by non-solvent water, and then underwent cleaning and drying processes. Then, a B film was formed. The B film had a thickness of about 25 μm. The formed composite film had a Gurley value of about 44 sec/10 cc. The composite film had a tensile strength of about 1100 kgf/cm$^2$, a puncture strength of about 200 gf/25 μm, and a thermal contraction rate (at 90° C./30 min) of about 4.0%(MD) and 0%(TD).

The Gurley value was measured by an ASTM-726(B) of a Gurley Densometer (Model 4120). The definition of the Gurley value was the time (by second) for 10 c.c of air to flow through a 1-sq-in. area of test material, under a pressure of 12.2 inch WG.

The tensile strength was measured by an ASTM-D638. The method of measuring the puncture strength is described below. The film was fixed between two hollow metal films. Each of the hollow metal films had a hole at a center with a diameter of 12.7 mm. A probe with a diameter of 2 mm was pressed to the film surface to break the surface at a speed of 2 mm/sec. The resistant to the probe was called puncture strength (gf/25 μm).

EXAMPLE 2

A battery separator of the embodiment included a porous polyethylene film and a porous thermal resistant film containing polyvinylidene fluoride and cellulose. A weight ratio of polyvinylidene fluoride (PVDF) and cellulose was 70/30.

First, a porous polyethylene film (A film) was manufactured as described in example 1 and had a thickness of about 15 μm. Next, PVDF and cellulose acetate was added into N-methyl-2-pyrrolidione (NMP) respectively to form solutions containing 14 wt % of PVDF or cellulose acetate. The PVDF and cellulose acetate solutions were mixed at a weight ratio of 70/30. The mixed solution was coated onto an A film. The coating was solidificated by non-solvent water, and then underwent cleaning and drying processes. Then, a B film was formed. The B film had a thickness of about 25 μm. The formed composite film had a Gurley value of about 26 sec/10 cc, a tensile strength of about 1150 kgf/cm$^2$, a puncture strength of about 200 gf/25 μm, and a thermal contraction rate (at 90° C./30 min) of about 4.2%(MD) and 0%(TD).

EXAMPLE 3

A battery separator of the embodiment included a porous polyethylene film and a porous thermal resistant film containing polyvinylidene fluoride and cellulose. A weight ratio of polyvinylidene fluoride (PVDF) and cellulose was 80/20.

First, a porous polyethylene film (A film) was manufactured as described in example 1 and had a thickness of about 15 μm. Next, PVDF and cellulose acetate was added into N-methyl-2-pyrrolidione (NMP) respectively to form solutions containing 14 wt % of PVDF or cellulose acetate. The PVDF and cellulose acetate solutions were mixed at a weight ratio of 80/20. The mixed solution was coated onto an A film. Then, the coating was solidificated by non-solvent water, and then underwent cleaning and drying processes. Then, a B film was formed. The B film had a thickness of about 25 μm. The formed composite film had a Gurley value of about 23 sec/10 cc, a tensile strength of about 1125 kgf/cm$^2$, a puncture strength of about 200 gf/25 μm, and a thermal contraction rate (at 90° C./30 min) of about 4.1%(MD) and 0%(TD).

EXAMPLE 4

A battery separator of the embodiment included a porous polyethylene film and a porous thermal resistant film containing polyvinylidene fluoride and polyethylene glycol (PEG). A weight ratio of polyvinylidene fluoride (PVDF) and polyethylene glycol (PEG) was 98.6/1.4-87/13.

First, a porous polyethylene film (A film) was manufactured as described in example 1 and had a thickness of about 15 μm. Next, PVDF was added into N-methyl-2-pyrrolidione (NMP) to form a solution containing 14 wt % of PVDF. Then, 1.4-13% of the polyethylene glycol was added into the solution to form a PVDF/PEG/NMP solution. The mixed solution was coated onto an A film. Then, the coating was solidificated by non-solvent water, and then underwent cleaning and drying processes. Then, a B film was formed. The B film had a thickness of about 30 μm. The formed composite film had a Gurley value of about 15-19 sec/10 cc, a tensile strength of about 1120 kgf/cm$^2$, a puncture strength of t about 210 gf/25 μm, and a thermal contraction rate (at 90° C./30 min) of t about 4.2%(MD) and 0%(TD).

EXAMPLE 5

A battery separator of the embodiment included a porous polyethylene film and a porous thermal resistant film containing polyimide (PI).

First, a porous polyethylene film (A film) was manufactured as described in example 1 and had a thickness of about 15 μm.

The formation of a B film is described below. 52 g of 4,4'-(4,4'-isopropylidiphenoxy)bis(phthalic anhydride) (BSAA) was dissolved in 28 g of NMP. The mixture was stirred for 30 minutes until BSAA dissolved completely. 20 g of 4,4-oxydianiline (ODA) was added to the mixture and stirred for another 4 hours to form polyamic acid. Acetic anhydride and pyridine were then added to the mixture and stirred for 1 hour at room temperature. Next, the mixture was heated and refluxed to 130° C. for 3 hours. The product was added into Methanol, and pallet was obtained after vacuum filtration. The pallet was washed by Methanol, acetone, and water and oven dried under vacuum to obtain organo-soluble polyimide (ODA-BSAAPI). The polyimide described above was dissolved in NMP to form 20 wt % of the polyimide solution. The polyimide solution was coated onto an A film, and 50/50 (vol) of NMP/H2O was used as a coagulant to solidify the coating. The B film was then formed with a thickness of about 30 μm. The formed composite film had a Gurley value of about 35 sec/10 cc. The composite film had a tensile strength of about 1100 kgf/cm$^2$. The composite film had a puncture strength of about 200 gf/25 μm. The composite film (at 90° C./30 min) had a thermal contraction rate of about 4.0%(MD) and 0%(TD).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multilayer battery separator, comprising:
   a porous polyethylene film; and
   a porous thermal resistant film selected from the group consisting of: polyvinylidene fluoride and cellulose having a weight ratio of 90/10-40/60; polyvinylidene fluoride and polyethylene glycol having a weight ratio of 99/1-85/15; and combinations thereof.

2. The multilayer battery separator as claimed in claim 1, wherein an average pore size of the porous thermal resistant film is no less than an average pore size of the porous polyethylene film, and wherein the porous polyethylene film is formed of a high density polyethylene resin.

3. The multilayer battery separator as claimed in claim 1, wherein the porous polyethylene film has a thermal shutdown temperature of between 125° C. and 135° C.

4. The multilayer battery separator as claimed in claim 1, wherein the porous polyethylene film has a Gurley value of between 5 and 200 sec/10 cc.

5. The multilayer battery separator as claimed in claim 1, wherein the porous thermal resistant film has a thermal meltdown temperature or a glass transition temperature of over 150° C.

6. The multilayer battery separator as claimed in claim 1, wherein the porous thermal resistant film has a thermal meltdown temperature or a glass transition temperature of over 160° C.

7. The multilayer battery separator as claimed in claim 1, wherein the porous thermal resistant film has a Gurley value of between 5 and 40 sec/10 cc.

8. The multilayer separator as claimed in claim 1, wherein the multilayer battery separator is used in a lithium-ion battery.

9. A method for manufacturing a multilayer battery separator, comprising:
   providing a porous polyethylene film;
   coating a thermal resistant film onto the porous polyethylene film to form a composite film using a wet process, wherein the porous thermal resistant film is selected from the group consisting of: polyvinylidene fluoride and cellulose having a weight ratio of 90/10-40/60, polyvinylidene fluoride and polyethylene glycol having a weight ratio of 99/1-85/15, and combinations thereof.

10. The method of manufacturing a multilayer battery separator as claimed in claim 9, wherein an average pore size of the porous thermal resistant film is no less than an average pore size of the porous polyethylene film, and wherein the porous polyethylene film is formed with a high density polyethylene resin.

11. The method of manufacturing a multilayer battery separator as claimed in claim 9, wherein the porous polyethylene film has a thermal shutdown temperature of between 125° C. and 135° C.

12. The method of manufacturing a multilayer battery separator as claimed in claim 9, wherein, the porous polyethylene film has a Gurley value of between 5 and 200 sec/10 cc.

13. The method of manufacturing a multilayer battery separator as claimed in claim 9, wherein the porous thermal resistant film has a thermal meltdown temperature or a glass transition temperature of over 150° C.

14. The method of manufacturing a multilayer battery separator as claimed in claim 9, wherein the porous thermal resistant film has a thermal meltdown temperature or a glass transition temperature of over 160° C.

15. The method of manufacturing a multilayer battery separator as claimed in claim 9, wherein the porous thermal resistant film has a Gurley value of between 5 and 40 sec/10 cc.

16. The method of manufacturing a multilayer battery separator a claimed in claim 9, wherein a dry process is used to form the porous polyethylene film.

* * * * *